US006731202B1

(12) United States Patent
Klaus

(10) Patent No.: US 6,731,202 B1
(45) Date of Patent: May 4, 2004

(54) VEHICLE PROXIMITY-ALERTING DEVICE

(76) Inventor: Duane Klaus, 17 Rogers Wood, San Antonio, TX (US) 78248-1623

( * ) Notice: Subject to any disclaimer, the term of this patent is extended or adjusted under 35 U.S.C. 154(b) by 0 days.

(21) Appl. No.: 09/966,418

(22) Filed: Sep. 28, 2001

Related U.S. Application Data

(60) Provisional application No. 60/272,199, filed on Feb. 28, 2001.

(51) Int. Cl.$^7$ ................................................ B60Q 1/00
(52) U.S. Cl. .................... 340/425.5; 340/901; 340/902; 340/903; 340/438; 340/436; 340/988
(58) Field of Search .............................. 340/425.5, 901, 340/902, 903, 438, 904, 436, 443, 444, 635, 906, 988, 989, 994

(56) References Cited

U.S. PATENT DOCUMENTS

| | | | | | |
|---|---|---|---|---|---|
| 3,967,575 A | * | 7/1976 | Coutts | .......................... | 359/550 |
| 4,117,457 A | * | 9/1978 | Latta | .......................... | 340/426 |
| 4,290,047 A | * | 9/1981 | Latta, Jr. | .................... | 340/427 |
| 4,479,699 A | * | 10/1984 | Bolte | ........................... | 350/99 |
| 5,005,661 A | * | 4/1991 | Taylor et al. | ................ | 340/427 |
| 5,262,757 A | * | 11/1993 | Hansen | ........................ | 340/427 |
| 5,737,247 A | * | 4/1998 | Baer et al. | ............. | 340/825.36 |
| 5,781,145 A | * | 7/1998 | Williams et al. | ......... | 455/226.2 |
| 6,411,896 B1 | * | 6/2002 | Shuman et al. | ............. | 701/209 |

\* cited by examiner

*Primary Examiner*—Jeffery Hofsass
*Assistant Examiner*—Daniel Previl
(74) *Attorney, Agent, or Firm*—Jackson Walker LLP

(57) ABSTRACT

A cycle-mounted vehicle proximity warning device warns a cyclist that a vehicle is approaching the cycle from the rear. A like device, worn by a pedestrian, warns the pedestrian of approaching vehicles. The warning device includes a vehicle detector circuit and an antenna that transmits and receives. The vehicle detector circuit detects a vehicle as it approaches the cycle or pedestrian and emits a detection signal. An alarm circuit responds to the detection signal and communicates an audible, visual, or tactile warning to the cyclist or pedestrian. The vehicle proximity warning device also includes a vehicle alert circuit that can activate a bright flashing light aimed at the approaching vehicle for the purpose of alerting its driver of the cyclist or pedestrian proximity.

16 Claims, 4 Drawing Sheets

VEHICLE PROXIMITY-ALERTING DEVICE

This application is based on and claims priority from provisional patent application, Ser. No. 60/272,199, filed Feb. 28, 2001.

BACKGROUND OF THE INVENTION

Pedestrians and slow-moving vehicles such as bicycles, must often share roads and highways with many types of fast-moving vehicles. In many cases, the pedestrian or slow-moving vehicle may not be visible to oncoming traffic. The pedestrian or slow moving vehicle, may not be aware of the approaching high speed traffic. This is a situation that can easily result in a serious accident.

Bicycles are typical of slow-moving vehicles with high potential for being victims of accidents with faster vehicles. Bicyclists rarely move as fast as normal highway traffic. They often are not completely aware of their surroundings due to poor visibility, helmets, wind noise, varying terrain, and other environmental factors. Most cycling traffic accidents occur either because the cyclist did not anticipate the approaching vehicle (often from the rear) or the driver of the vehicle did not see the cyclist in time to take evasive action.

In addition to cyclists, there are many other potential victims of fast-moving vehicles both on and off the road. These include pedestrians, skiers, highway workers, rollerbladders, skaters, and other personnel that must use highways, roads, or trails where visibility may be limited. Larger vehicles with limited visibility, including motorcycles, horse-drawn vehicles, and farm vehicles, may also be involved in accidents with rapidly approaching vehicles.

To reduce the possibility of accidents, slow moving, limited-visibility vehicles, and pedestrians would be aided by a proximity detector that would warn them of oncoming traffic and make the oncoming traffic aware of their presence. A vehicle proximity-alerting device could help avoid many of these potential accidents and possibly decrease the morbidity and mortality of cyclists, pedestrians, and others.

There are a large number of possible applications for a proximity detector that would warn users of oncoming traffic and make the oncoming traffic aware of their presence. The following are some examples of slow-moving and/or low-visibility road users in need of a vehicle proximity-alerting device: motorized: motorcycles, farm vehicles, construction vehicles, mail delivery vans, buses; non-motorized: bicycles, skateboards, roller blades, scooters, skates, small battery-powered cars, infant strollers, horses, horse-drawn vehicles; and pedestrian: children, walkers/joggers/runners, and highway workers.

The following are some examples of slow-moving and/or low-visibility off-road users of a vehicle proximity-alerting device: motorized: airport equipment (baggage cars, tow truck, etc.), amusement park trams, motor boats; non-motorized: off-road bicycles, row boats, sailboats; and pedestrian: skiers, and construction workers.

One example of a practical application is be a vehicle proximity-alerting device for motorcycles. Motorcycle accidents involving other vehicles are often fatal to the motorcycle rider. Although a motorcyclist is usually alert to the presence of other vehicles, it is not always the case. Also, motorcycles are often not perceived by motorists. The "Motorcycle Accident Cause Factors and Identification of Countermeasures," was a study conducted by the University of Southern California (USC). With funds from the National Highway Traffic Safety Administration, researcher Harry Hurt investigated almost every aspect of 900 motorcycle accidents in the Los Angeles area.

Additionally, Hurt and his staff analyzed 3,600 motorcycle traffic accident reports in the same geographic area. Some of the findings relevant to vehicle/motorcycle accidents from the report are summarized as follows:

1. Approximately three-fourths of these motorcycle accidents involved collision with another vehicle, which was most usually a passenger automobile.
2. In the multiple-vehicle accidents, the driver of the other vehicle violated the motorcycle right-of-way and caused the accident in two-thirds of those accidents.
3. The failure of motorists to detect and recognize motorcycles in traffic is the predominating cause of motorcycle accidents. The driver of the other vehicle involved in collision with the motorcycle did not see the motorcycle before the collision, or did not see the motorcycle until too late to avoid the collision.
4. Conspicuity of the motorcycle is a critical factor in the multiple vehicle accidents, and accident involvement is significantly reduced by the use of motorcycle headlamps (on in daylight) and the wearing of high visibility yellow, orange, or bright red jackets.
5. The view of the motorcycle or the other vehicle involved in the accident is limited by glare or obstructed by other vehicles in almost half of the multiple-vehicle accidents.

SUMMARY OF THE INVENTION

Applicants proximity-alerting device is designed to accommodate a wide range of applications. For some applications, the proximity-alerting device is designed for a specific application. For example, at night a pedestrian or road worker may not require as bright a warning light as a daytime user. For this application, it is be feasible to use flashed LEDs, thereby reducing power and weight so that the detector could conveniently be worn on a person's back.

Applicant provides approaching-vehicle proximity-alerting device designed to alert both the oncoming vehicle driver and the user of the device. Such a device includes several components. A low-power radar or another appropriate detector determines vehicle proximity (by velocity and/or distance). A flashing light is produced by the device to alert the driver of the oncoming vehicle by stimulating his visual perception. Depending on the user application (pedestrian, bicyclist, etc.), the device includes an audible, tactile and/or visual signal emitter at the same time that the driver of the oncoming vehicle is alerted by the flashing light. The vehicle-detection, visual-alert, and audible-alert circuits control and timing circuits initiate the alert upon correct detection of a vehicle. The alert device may be incorporated into other equipment such as, music earphones, heart rate monitors, and ear protection devices. Power for all circuits is supplied by internal batteries or supplied by an external power source in some applications.

The detection circuits typically consist of a simple low-power continuous wave Doppler radar. Currently, a complete RF Doppler radar module based on GUNN diode technology can be purchased commercially for approximately $75 (MA/COM Model MA87728-MO1). A similar module has a planar array and printed circuit board The detector and additional electronics, including control circuits and output circuits (audible and visual), are typically provided as a single printed circuit board.

For some applications, the device power requirements reduce the duty cycle of one or more circuits. As an example, the duty cycle of a GUNN diode radar may readily be reduced by a factor of ten. The radar may operate for ten milliseconds and be in an off state for ninety milliseconds. During the ninety milliseconds off state, an oncoming vehicle traveling at one hundred miles per hour would close by only thirteen feet. For the GUNN module previously described, the normal detection range would be on the order of about two hundred feet. Reducing the duty cycle by a factor often would reduce the range less than 7%. Similar duty cycle reduction on the other circuits may also be appropriate for some applications.

Infrared radar is provided as an alternate detector, especially for night use. Infrared radars typically use solid-state infrared laser diodes and are known as LADARs. They generally use a semiconductor diode to generate laser light. Most vehicle traffic LADARS emit laser light at around 904 nm wavelength. Other wavelengths are possible; for example, aluminum gallium arsenide (AlGaAs) diodes emit light at a wavelength of 850 nm. Gallium arsenide (GaAs), classified as an injection laser, emits light between 880 nm to 900 nm. Other wavelengths are possible using other materials or alloys.

The Federal Communications Commission (FCC) regulates radiated emissions from high-speed circuits such as the processing circuits inside a LADAR, but not infrared and light frequencies. The Federal Drug Administration (FDA) Center for Devices and Radiological Health (CDRH) regulates laser products sold in the United States. Traffic LADARs are Class 1 devices (by American National Standards Institute definition) and considered eye-safe based on current medical knowledge.

New ultra-wideband radar technology based on very narrow pulses has the potential for providing both range and speed information using very low power. Although not commercially available at this time, there is potential for use of ultra-wideband radar as the vehicle detector for a proximity-alerting device.

DETAILED DESCRIPTION OF THE PREFERRED EMBODIMENT

Figure 1:
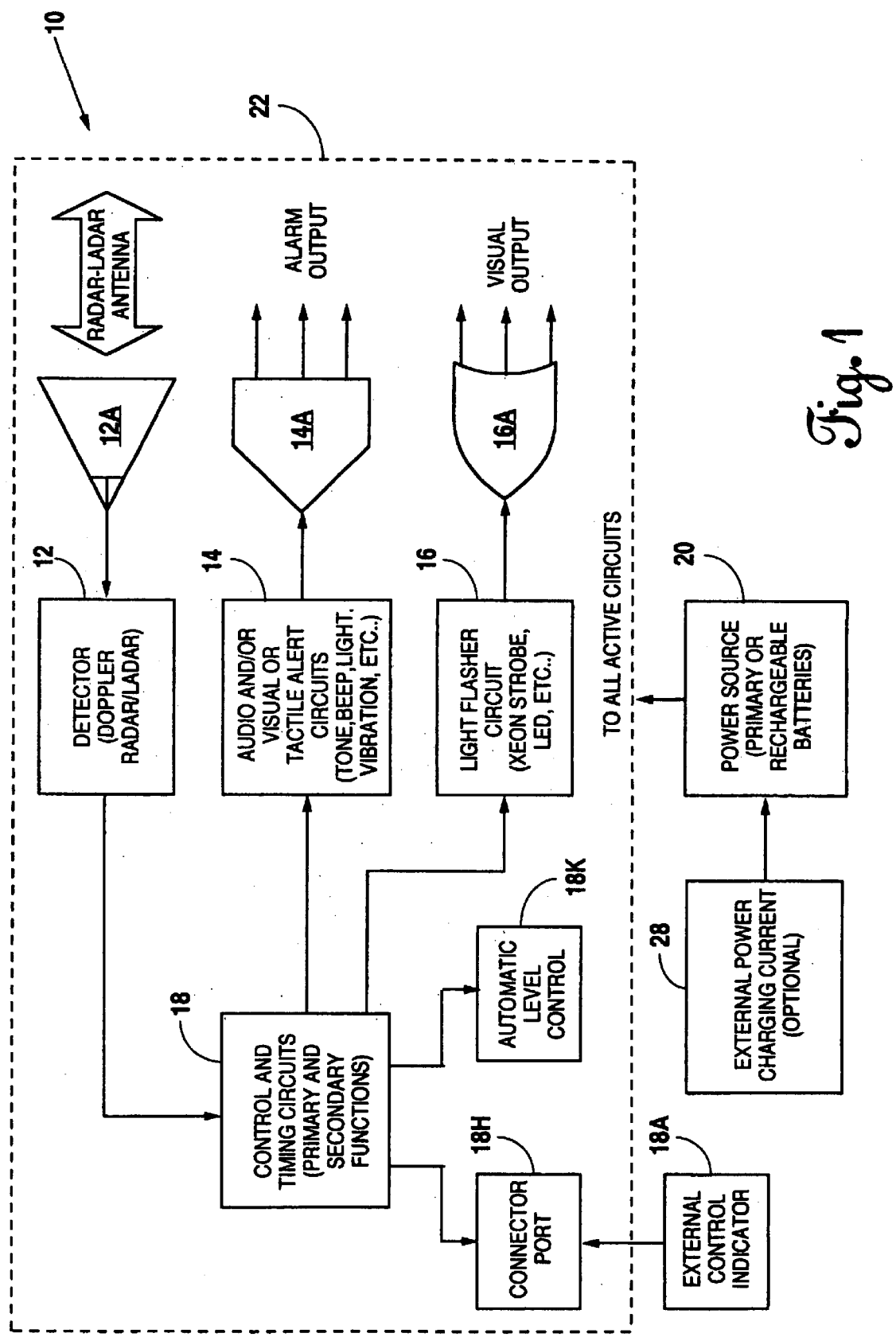
FIG. 1 illustrates a housing containing some of the circuits and elements of the present invention as well as some of the circuits and elements of the present invention that are external to the housing, and block diagram

A block diagram of a vehicle proximity-alerting device 10 is shown in FIG. 1. The oncoming vehicles are detected by radar or other form of vehicle proximity detector circuit 12 that gives an indication of the approaching vehicle velocity and/or range information. Doppler or ultra wideband (narrow pulse) radar circuits incorporated into the detector circuit 12 provide the detector function, although other detectors such as laser detection and ranging (LADAR) circuits may also be suitable. An appropriate transmitting and receiving antenna 12A is included as part of the detector circuit 12.

Figure 2:
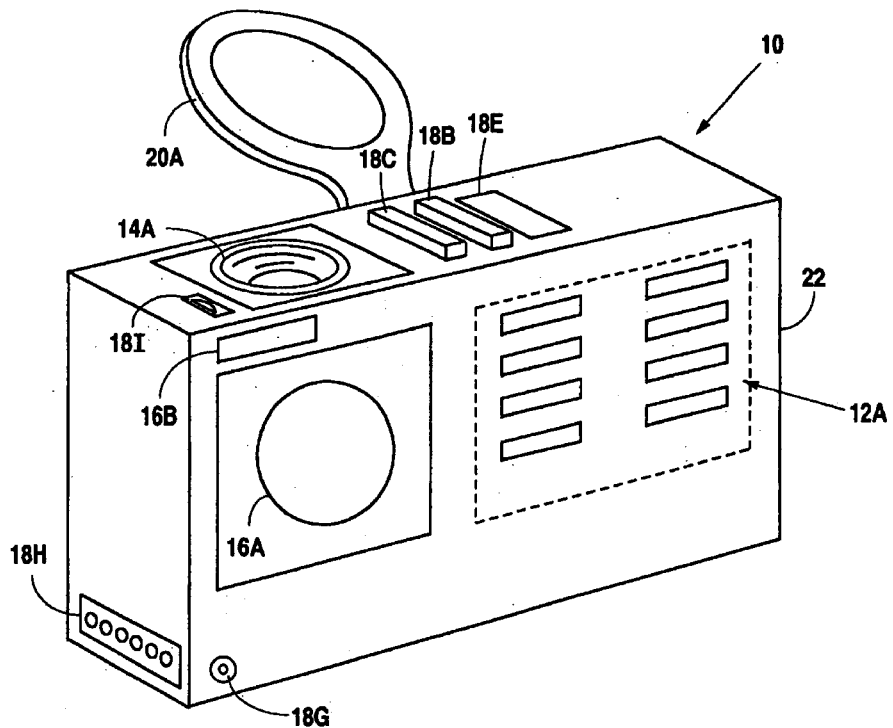
FIG. 2 illustrates an external, isometric view of the housing invention illustrating some of the components thereof.

The control and timing circuit 18 (implemented, for example, by a conventional microprocessor or microcontroller) interprets the signals received from the detector circuit 12. When the range and/or velocity of the oncoming vehicle is interpreted by detector control and timing circuit 18 as meeting the requirements preselected (distance and/or speed) for an alert, the control and timing circuit 18 then activates both the rider alarm circuit 14 and the vehicle alert circuit 16. When the vehicle is no longer present, the rider alaim circuit 14 and vehicle alert circuit 16 terminate their alerts. These circuits may provide secondary functions (including a theft alarm beacon). As part of the control and timing circuit 18 and mounted within housing 22 there may optionally be manually activated control switches including those with the following functions: on-off switch 18B; self-test mechanism 18C; battery status check indicator 18E; and headphone connection 18G. (See FIG. 2).

Once initiated by the control and timing circuit 18, the vehicle alert circuit 16 will supply power to an xenon strobe, light emitting diode (LED), or other bright light or visual output means 16A at a pulse rate that would be best perceived by an oncoming vehicle. The pulse rate would typically be approximately 3 to 5 pulses per second to distinguish it from other vehicle light pulsing modes. When the detection circuit 12 and control and timing circuit 18 indicates that a vehicle is no longer present, the vehicle alert circuit 16 ceases to supply power to the flashing light source(s) or other visual output 16A. Changes in light conditions (day to night, etc.) may require the addition of a intensity control circuit for the circuit output that would change intensity of the flasher output in response to an ambient light sensor 16B.

Once initiated by the control and timing circuits 18, the rider alarm circuit 14 supplies an appropriate tone, beep, etc., to an alarm output device 14A (for example, a loud speaker, piezoelectric transducer or buzzer) at a volume or level that would be best perceived by the rider. When the detection circuit 12 and timing circuit 18 indicates that a vehicle is no longer present (within the pre-selected detection range), the rider alarm circuit 14 ceases to supply a signal to the alarm output device(s) 14A. In addition to user volume-level control 18I (limited to some minimal value), an automatic level control 18K may be necessary for applications where ambient noise levels vary. A suitable ambient noise level signal to (e.g. in 18A) provides yautomatic level control 18K which can be implemented by the aforementioned microprocessor or microcontroller).

The power source 20 supplies the electrical power required by all active circuits within the device 10. Depending on the user application, power is to be supplied by either rechargeable or primary batteries. In some applications, external power source 28, such as a vehicle's electrical system, is supplied directly to the active circuits while simultaneously charging backup batteries.

Figure 2A:
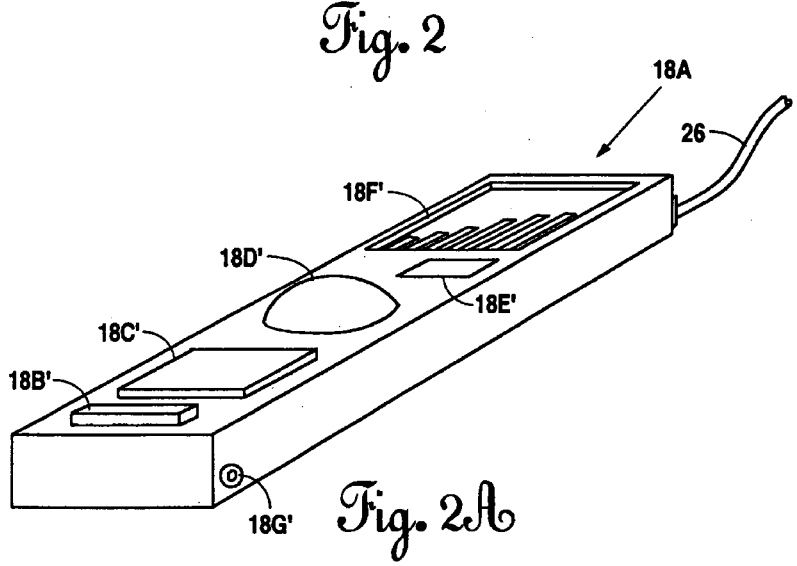
FIG. 2A is a perspective view of external controls and indicator of the present invention suitable for mounting at a position or location removed from the housing.

The need for external controls and indicators 18A (meaning not withing housing 22) is application dependent. In some cases, external controls and indicators 18A consist of only a remote on/off switch 18B' and/or a switch for testing the operation of the device 18C' (self-test). In other applications, they include an on/off switch 18B', visual alert 18D', battery status indicator 18E', vehicle velocity indicator 18F', and headphone connection 18G', etc. (See FIGS. 2A and 3A). If a vehicle velocity indicator 18F' is included, it may be a bar graph. The output alarm device may include blinking light 18F," which may increase in speed as the distance between the car and device user narrows (See FIGS. 2A and 3A). The blinking light may be used with or in place of a loud speaker. The external controls and indicators 18A may be included or be made part of a separate speedometer or a heart rate monitor. Housing 22 and control and timing circuit 18 may contain a port 18H (or several) to connect the external controls and indicators 18A to the control and timing circuit 18 by way of an external control connector 26. (See FIGS. 2, 2A and 3A). External controls and indicators 18A may be mounted in front of the bicycle, specifically the handlebars, by way of a mounting bracket 28. (See FIG. 3A).

A vehicle proximity-alerting device 10 is intended to alert both the user of the device 10 and the driver of the oncoming vehicle. But, in some instances, alerting the driver of the oncoming vehicle may be of greater value. In accidents between oncoming motor vehicles and pedestrians or slower vehicles, the vehicle driver involved in the collision often does not see the pedestrian/slower vehicle before the collision, or with enough time to avoid the collision Slow vehicles and even pedestrians often use lights to alert other vehicles to their presence, but the lights are not always effective because they are not perceived. On the other hand, it has been shown that a distinct change in the light from a scene is easily perceived. Therefore, the alerting effectiveness of a flashing light is compounded if the flashing is initiated while the motorist is proximally located within sight of the system. Also, not having the light flash constantly saves power (important for battery life) and would be less distracting to other observers. Of course, even if the oncoming vehicle did not see the flashing light, the device user would benefit from an audio or visual alert that a potentially threatening vehicle was approaching.

Figure 3:
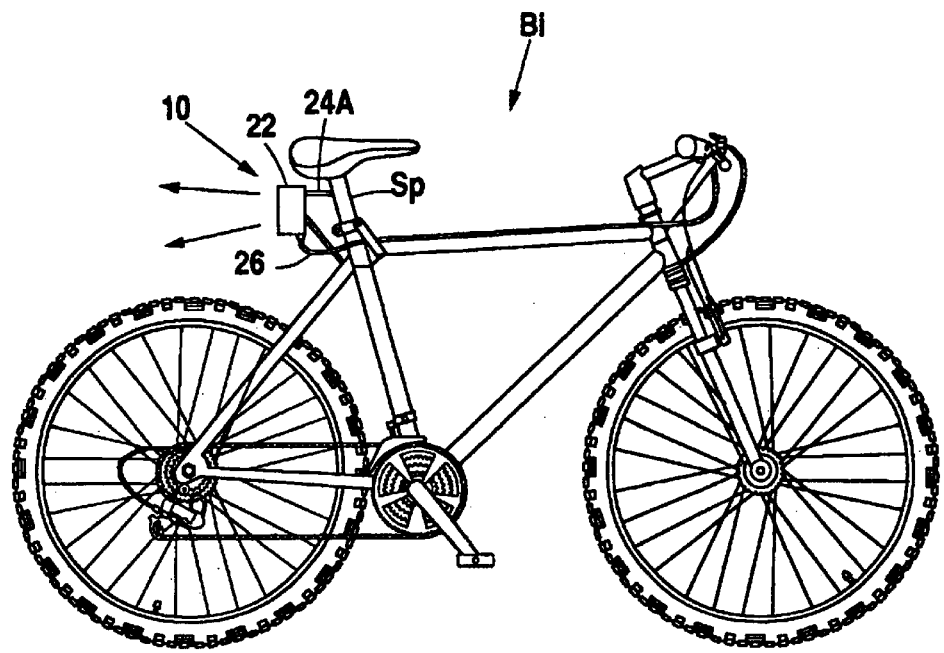
FIG. 3 is a side elevational view of Applicant's present invention as mounted to a bicycle.
Figure 3A:
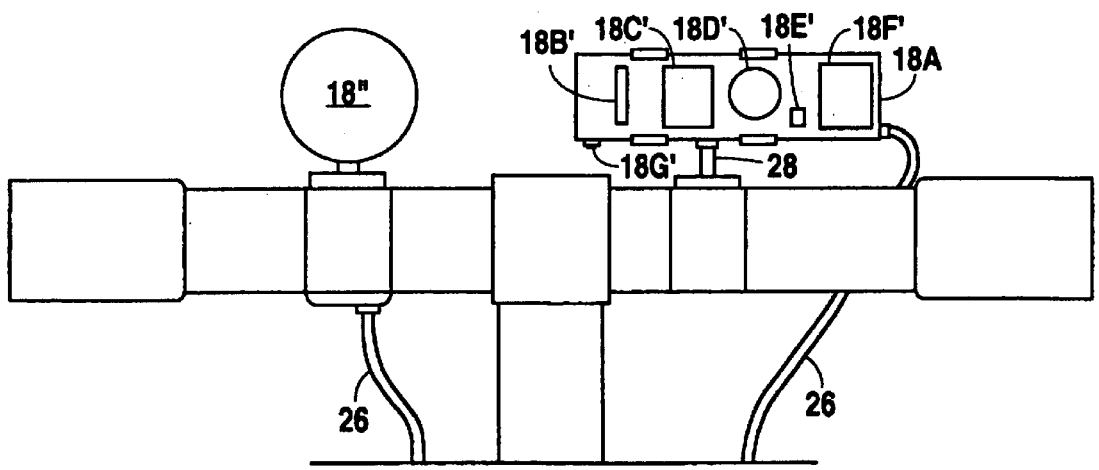
FIG. 3A illustrates components of Applicant's present invention as mounted to the handle bar of a bicycle.
Figure 5:
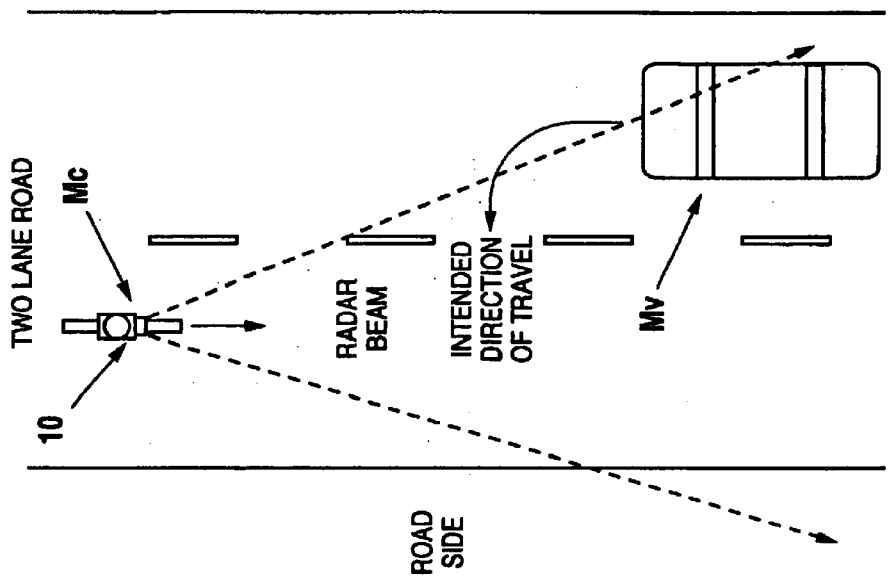
FIG. 5 is an overhead view of Applicant's present invention mounted to a motorcycle in an operating situation.
Figure 4:
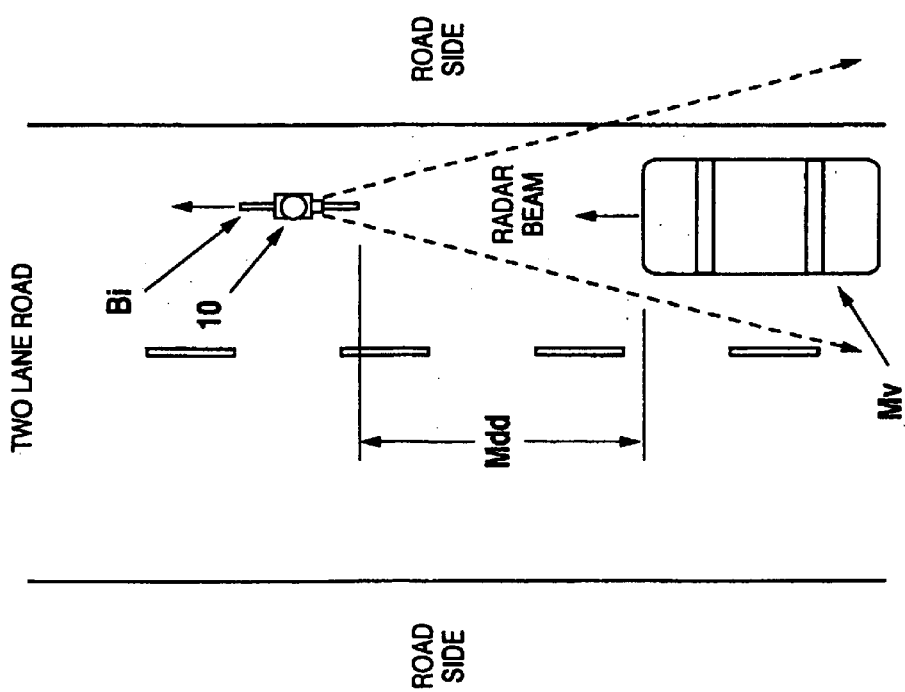
FIG. 4 is an overhead view of Applicant's present invention as mounted to a bicycle in an operating situation.

Turning now to FIGS. 3, 4, and 5, the Applicant's vehicle proximity-alerting device 10 is exemplified by the bicycle application (FIGS. 3 and 4). The housing of the vehicle proximity-alerting device 10 would be mounted on a bicycle Bi, typically at seat post Sp and aimed (at least the antenna) to the rear of the bicycle (See FIG. 3). The visual output 16A, such as a strobe light, would flash an intense light toward the vehicle Mv when the vehicle reached a preset distance Mdd (typically about 200') from the bicycle informing the vehicle Mv driver of the bicycle. The motorist should quickly notice the initiation of a flashing light due to its high visibility. The alerted motorist could then maneuver to provide sufficient clearance while passing the cyclist. Simutaneously, a rider alarm output device 14A, such as a loud speaker or in a preferred embodiment, a handlebar mounted light output 18F" or speaker will alert the rider (See FIGS. 2 and 3A). The cyclist would then move closer to the side of the road, avoid turning into the vehicle, and become more alert at a time when vigilance is very crucial.

The proximity-alerting device 10 is designed to accommodate various vehicle speeds and set distance combinations. For example, a bicyclist may not be concerned with vehicles approaching from the rear at closing speeds less than twenty miles per hour (see FIG. 4). At this closing speed, the vehicle should be able to maneuver to avoid the bicycle. By use of ranging information provided from the detector 12, the distance to an oncoming vehicle can be made a factor in determining when to initiate the alert. The alert can be initiated when an oncoming vehicle is traveling at sixty miles per hour relative speed two hundred feet from a bicycle or at thirty miles per hour relative speed when one hundred feet from the bicycle. This would give about the same amount of warning time to respond to either vehicle. These alert parameters may be altered to provide optimal conditions in different applications, i.e. pedestrian, skier or motorcycle rider. Further, the device may be used to detect the presence of a vehicle at a preset distance, regardless of the vehicles closing speed.

Product practicality for a given application often hinges on cost. Applicant provides a cost-effective detector including, low-cost packaging. For most applications, packaging as a single unit with housing 22 is provided. For example, a single bicycle seat post-mounted radar module may detect vehicles, fire a strobe, and sound an audible alarm to alert the cyclist. Two units (a control unit on the handlebars and radar on the rear) may be provided but will typically require additional packaging, including wire interconnections. An example of a two unit application includes a construction vehicle (Payloader, crane, etc.), where a dash-mounted visual alert would probably be of value to the user.

Although primarily intended for use where the device user is not aware of oncoming vehicles, applicant includes embodiments where the timeliness of the alert would be of value even though the user is aware. One such application includes use on a motorcycle facing oncoming traffic. This situation has a high accident potential when an oncoming vehicle approaching a motorcycle from the front turns across the path of the motorcycle (see FIG. 5). If the closing speed is high, the motorcyclist may not have sufficient time to react. As alluded to in the Hurt report, vehicles not yielding the right of way cause many often serious or fatal motorcycle accidents.

Thus, in FIG. 5, applicant provides forward-oriented proximity-alerting device 10 facing the oncoming traffic to "flash" an alert to the oncoming vehicle if the closing speed is too high for a motorcyclist to react. For traffic closing at less than that speed, the proximity-alerting device 10 may be adjusted so as not to flash an alert. Any orientation of the oncoming vehicle to the proximity detector may be of value if the threatened vehicle cannot react to the oncoming vehicle in time. In this situation, a forward-mounted vehicle proximity-alerting device is provided to flash a visual alert to an oncoming vehicle when the combined closing speed between the motorcycle and vehicle leaves minimal time for either vehicle to react. To minimize alert flashes to other oncoming traffic, the control and timing circuits 18 are designed to flash only when it determines (by distance and velocity measurement) that both the closing speed leaves minimal time for either vehicle to react and the oncoming vehicle is decelerating (preparing to turn). In this situation, an audible or a visual alert to the motorcyclist may be omitted (the motorcyclist is facing the vehicle), but should be included in the design to inform the motorcyclist that a vehicle alert has been flashed.

Some applications of a vehicle proximity-alerting device 10 may also benefit from secondary capabilities of Applicant's device. For example, the motorcycle vehicle proximity-alerting device optionally includes a motion sensor in the control and timing circuit 18 that would detect motion of the motorcycle when no motion is expected (that is, for example, the motorcycle engine is not running). This motion information is used to sound the visual and audio alarms of possible theft or vandalism. If the motorcycle is stolen, the control and timing circuits 18 are optionally designed to initiate a silent beacon (no visual or audio alarms). The beacon would use the vehicle proximity-alerting device radar as a radio frequency transmitting beacon that may tracked by a remote receiver (not shown) for recovery of the motorcycle. These optional functions may also be useful for other high-value platforms such as farm and construction equipment.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall which the scope of the invention.

I claim:

1. A cycle mounted cycle-mounted vehicle proximity warning device, comprising:
   a vehicle detector circuit including a transmitting and receiving antenna, the vehicle detector circuit capable of detecting a vehicle proximately located with respect to a cycle and emitting a signal responsive thereto;
   a rider alarm circuit including an alarm emitting output means for communicating to the rider that a vehicle is proximately located with respect to the cycle;
   a cycle-mounted vehicle alert circuit including visual output means for alerting the driver of the proximately located vehicle wherein the visual output means is capable of emitting a visual output at a rate of between about three times per second and about five times per second;
   a control and timing circuit engaged with the vehicle detector circuit, the rider alarm circuit and the vehicle alert circuit for controlling the rider alarm circuit and vehicle alert circuit in response to the vehicle detector circuit signaling of the proximately located vehicle;
   a power supply for powering the circuits of the vehicle proximity warning device;
   means for mounting the antenna of the vehicle detector circuit to the cycle such that the antenna faces the rear of the cycle; and
   an external control circuit for engaging the control and timing circuit of the vehicle proximity warning device, the external central circuit capable of allowing the rider to manually check the operation of the unit.

2. The vehicle proximity warning device of claim 1 further comprising:
   a housing capable of engagement with the cycle for enclosing at least the vehicle detector circuit, the rider alarm circuit, the vehicle alert circuit and the control and timing circuit of the vehicle proximity warning device.

3. The vehicle proximity warning device of claim 2 further comprising:
   an external control circuit for engaging the control and timing circuit of the vehicle proximity warning device, the external control circuit removed from the housing.

4. The vehicle proximity warning device of claim 2 wherein the alarm emitting output means of the rider alarm circuit includes one of the following: acoustic means, visual means or tactile means.

5. The vehicle proximity warning device of claim 1 further comprising:
   an external control circuit for engaging the control and timing circuit of the vehicle proximity warning device, the external control circuit removed from the housing.

6. The vehicle proximity warning device of claim 1 further comprising:
   an external control circuit for engaging the control and timing circuit of the vehicle proximity warning device, the external control circuit capable of allowing the rider of the bicycle to check the status of the power supply.

7. The vehicle proximity warning device of claim 1 further comprising:
   an external control and indicator circuit for engaging the control and timing circuit of the vehicle proximity warning device, the external control circuit and indicator circuit capable of transmitting to the rider signals including at least one of the following: self-test signal, vehicle proximity signal, battery status and vehicle velocity.

8. The vehicle proximity warning device of claim 1 further comprising:
   a vehicle velocity circuit, the vehicle velocity circuit including a visual vehicle velocity indicator for signaling to the cyclist the relative velocity of the vehicle with respect to the bicycle.

9. The vehicle proximity warning device of claim 1 wherein the vehicle detector circuit is capable of the transmission and receiving either radar or ladar signals.

10. The vehicle proximity warning device of claim 1 wherein the alarm emitting output means of the rider alarm circuit includes one of the following: acoustic means, visual means or tactile means.

11. The vehicle proximity warning device of claim 1 wherein the visual output means of the vehicle alert circuit includes either a strobe light or a light emitting diode.

12. The vehicle proximity warning device of claim 1 wherein the vehicle detector circuit and the rider alarm circuit are capable of activating the rider alarm circuit when a vehicle is approaching a cyclist from the rear.

13. The vehicle proximity warning device of claim 1 wherein the vehicle detector circuit and the rider alarm circuit are capable of activating the rider alarm circuit when a vehicle is approaching a cyclist from the rear, at a preset minimum closing speed.

14. A vehicle proximity warning device for use with a motorcycle, the vehicle proximity warning device comprising:
   means, including a control and timing circuit, for emitting a high powered intermittent light signal at a rate of between about three times per second and about five times per second;
   an external control circuit for engaging the control and timing circuit of the warning device, the external circuit capable of allowing the rider to manually check the operation of the unit;
   means for detecting the closing speed between the motorcycle and the vehicle;
   means for energizing the emitting means when the closing speed exceeds a pre-selected minimum and the vehicle is slowing;
   means for mounting the emitting means to the motorcycle such that the light signal flashes forward from the motorcycle;
   means to detect motion of the motorcycle when an arming means is engaged;
   means to arm the motion detect means when the motorcycle is left unattended; and
   means engaging the motion detect means for signaling and energizing the light emitting means when motion is detected.

15. The vehicle proximity warning device of claim 14 further comprising:

means to detect motion of the motorcycle when an arming means is engaged;

means to arm the motion detect means when the motorcycle is left unattended; and means engaging the motion detect means for signaling and energizing the light emitting means for signaling and energizing the light emitting means when motion is detected.

16. A pedestrian-mounted vehicle proximity warning device comprising:

a vehicle detector circuit including a transmitting and receiving antenna, the vehicle detector circuit capable of detecting a vehicle proximately located with respect to a pedestrian and emitting a signal responsive thereto;

a pedestrian alarm circuit including an alarm emitting output means for communicating to the pedestrian that a vehicle is proximately located with respect to the pedestrian;

a pedestrian-mounted vehicle alert circuit including visual output means capable of emitting a visual output at a rate of between about three times per second and about five times per second, for alerting a driver of the proximately located vehicle;

a control and timing circuit engaged with the vehicle detector circuit, the pedestrian alarm circuit and the vehicle alert circuit for controlling the pedestrian alarm circuit and vehicle alert circuit in response to the vehicle detector circuit signaling of the proximately located vehicle;

an external control circuit for engaging the control and timing circuit of the vehicle proximity warning device, the external control circuit capable of allowing the pedestrian to manually check the operation of the unit;

a power supply for powering the circuits of the vehicle proximity warning device; and means for mounting the antenna of the vehicle detector circuit to the pedestrian.

* * * * *